Aug. 19, 1969          J. A. ROLAND                3,461,812
                       TOW TRUCK SYSTEM
Filed June 1, 1966                            2 Sheets-Sheet 1
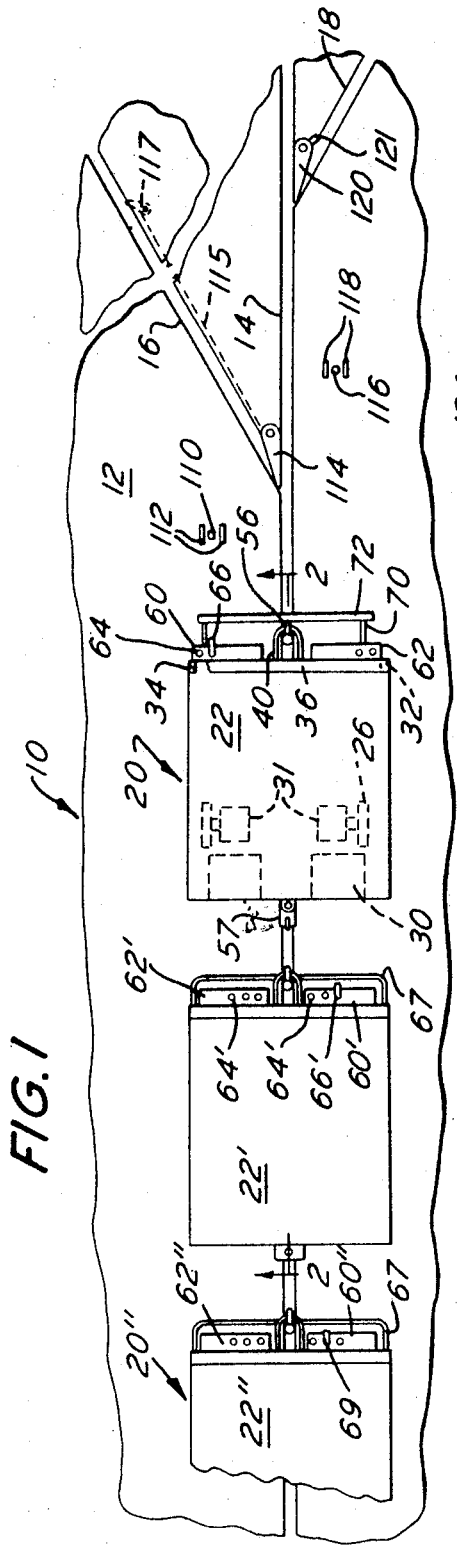
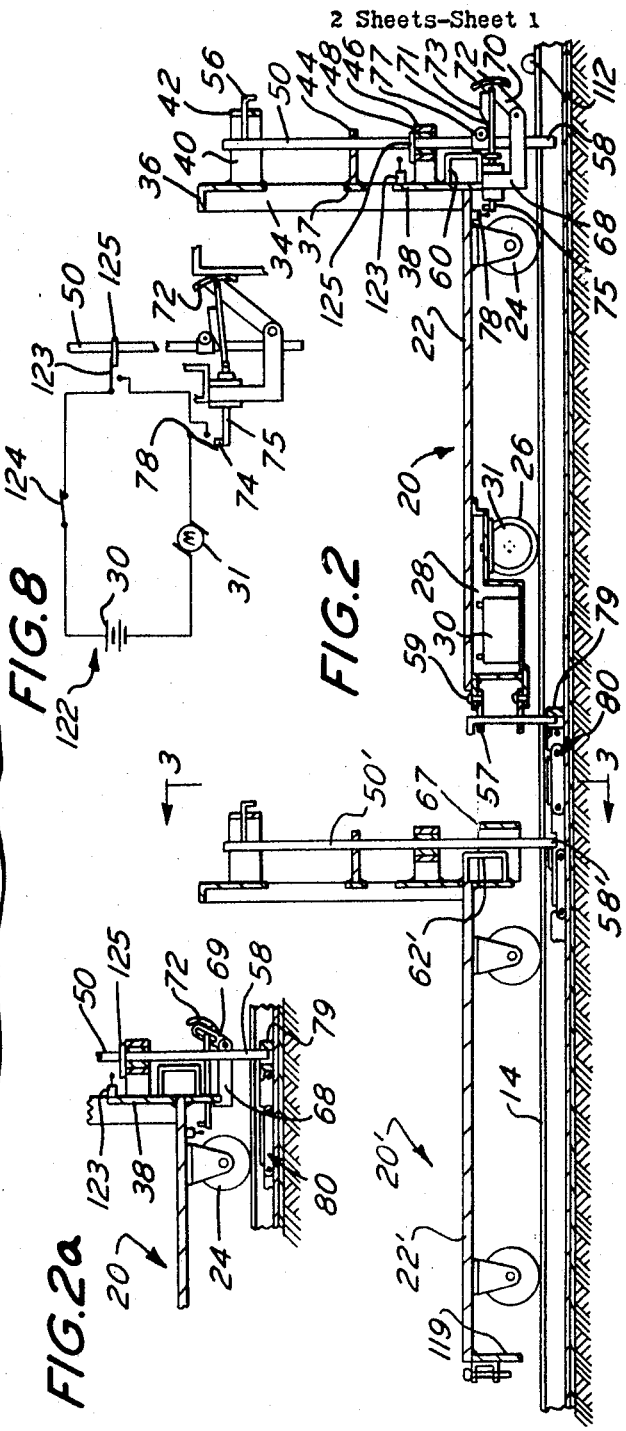
INVENTOR.
JAMES A. ROLAND
BY Seidel & Gonda
ATTORNEYS.

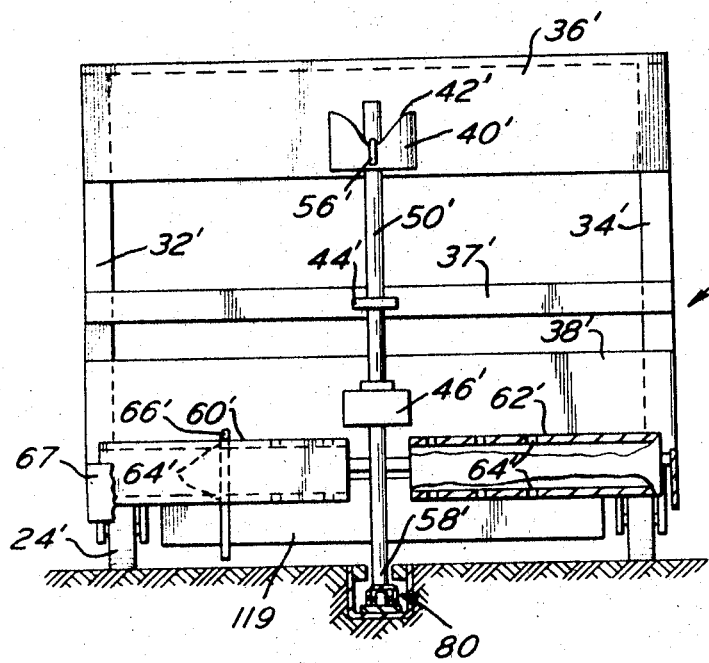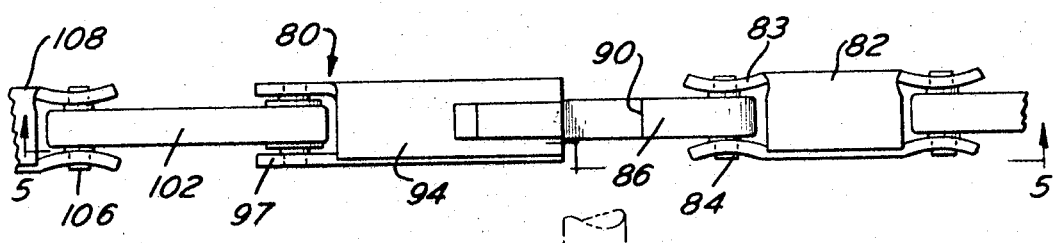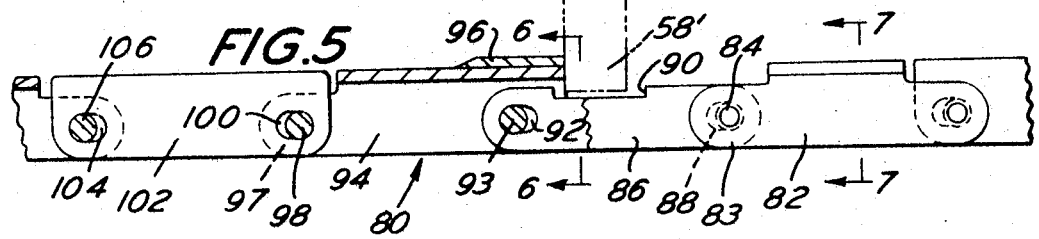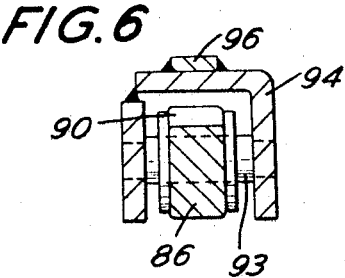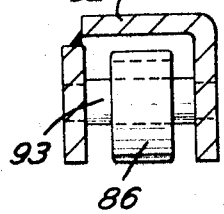

United States Patent Office 3,461,812
Patented Aug. 19, 1969

3,461,812
TOW TRUCK SYSTEM
James A. Roland, Elmwood Park, Ill., assignor to SI Handling Systems, Inc., Easton, Pa., a corporation of Pennsylvania
Filed June 1, 1966, Ser. No. 554,385
Int. Cl. B61b 13/00; B61c 11/02
U.S. Cl. 104—172                   12 Claims

ABSTRACT OF THE DISCLOSURE

A tow truck system is disclosed wherein a train of tow trucks is pulled by a driverless self-propelled tractor. The tractor and trucks are guided along a path defined by a slot and means on the tractor and truck which extends into the slot. The tractor pulls a chain disposed entirely within the slot. Each truck is capable of being removably coupled to the chain while the chain is stationary or moving. The train may be caused to transfer to a shunt slot by a preselection of a mechanism on the tractor. The tractor may be provided with an obstruction sensing means which interrupts the drive on the tractor.

---

This invention relates to a tow truck system. More particularly, this invention relates to a material handling system wherein a self-propelled tractor includes a tow pin extending through a main slot in or above a floor, and pulls the tow trucks and/or other vehicles coupled thereto.

In the system of the present invention, a pin on a tractor extends through a main slot, and by engagement with the sides thereof, guides the tractor. Also, the tractor is connected to a tow line, preferably in the form of a flexible chain, which trails behind the tractor. Tow trucks, not self-propelled, are provided, and include guide pins extending through the main slot and into engagement with the chain. Engagement of the guide pins of the additional trucks with the chain causes the trucks to be drawn thereby.

In the system of the present invention, shunt slots, which intersect the main slot at spaced points therealong, permit routing of the tractor and/or trucks to various locations. Switching means are provided at the intersections of the main and shunt slots, and actuators are provided therefor. It is within the scope of the present invention that individual trucks or the entire train be made to enter any desired shunt slot, and directed thereby to a preselected area.

The self-propelled tractor is also provided with obstruction sensing means for interrupting drive of the tractor wheels. Thus, should the self-propelled tractor contact another truck on its track, or any other physical obstruction, the possibility of damage or injury is obviated by cutting off the drive. Also, the drive may be interrupted when the tow pin is disengaged from the chain, intentionally or otherwise.

The system of the present invention is particularly adaptable for use in warehouses, freight terminals, and the like. The area to which the shunt slot extends may be a loading, an unloading, or a storage area. The function of the area is not important, but its location relative to the main slot is important. Thus, the shunt slots are provided extending to positions in which the need for trucks is foreseeable. When the slots are disposed in a floor, metallic flanged elements are provided to define their edges. The tow line may be disposed beneath the slot, or alternatively, may be disposed in a plane above the slot.

The tractors and trucks of the present invention are provided with a vertically disposed guide pin in a front portion thereof. A selectively movable means is provided for raising the pin and keeping it in a raised position. Also, means such as those shown in U.S. Letters Patent 3,316,856, whereby the guide pin is lifted in response to contact between the bumper and an obstruction, may be provided. As indicated above, raising of the pin may also cut off drive on the tractor.

The trucks of the present invention are provided with means including a trip rod or a pair of trip rods on opposite sides of the guide pin. Means are provided for varying the spacing of the trip rod on each side of the guide pin. Use of a particular spacing permits the trip rod to engage a particular switch actuator to direct the guide pin of a particular truck into a selected shunt slot.

The present system, because it uses a self-propelled tractor, is economical and easy to install. Thus, the slot need only serve as a guide for the guide pins and the tow line. No drive or conveyor apparatus is contained therein. Accordingly, the structure defining the slot of the present invention, which is more fully described in copending application Ser. No. 405,951, assigned to the assignee of the present invention, is considerably more compact than those heretofore known. More specifically, such structure has a cross section of less than 20% of the standard conveyor cross section area. Accordingly, the present system may be economically and easily installed, even on the upper stories of existing buildings. Also, the system of the present invention may be easily relocated or extended. The system of the present invention is also quieter in operation than those heretofore known, since the tow line is relatively short, generally on the order of 100 feet.

It is an object of the present invention to provide a novel material handling system wherein a tractor pulls a train of trucks.

It is another object of the present invention to provide a tractor dispatch system which includes a novel self-propelled vehicle.

It is yet another object of the present invention to provide a novel self-propelled tractor which includes means for interrupting drive in response to the presence of obstructions.

It is still another object of the present invention to provide a system in which a self-propelled tractor draws a tow line, and tow trucks are selectively coupled to the tow line.

It is still another object of the present invention to provide a dispatch system wherein a selectively operable means on a tractor actuates a switch to direct the tractor from movement along a main slot to movement along a shunt slot.

For the purpose of illustrating the invention, there is shown in the drawings a form which is presently preferred; it being understood, however, that this invention is not limited to the precise arrangements and instrumentalities shown.

FIGURE 1 is a top plan view of a system according to the present invention.

FIGURE 2 is a side elevation, partially in section, showing the tractor, tow line, and one tow truck of the present invention.

FIGURE 2a is a partial elevational view showing a modification of a portion of the invention.

FIGURE 3 is a front elevational view, partially in section, taken along the line 3—3 in FIGURE 2.

FIGURE 4 is a top plan view of a tow line used in conjunction with the present system.

FIGURE 5 is a side elevation, partially in section, taken along the line 5—5 in FIGURE 4.

FIGURE 6 is a sectional view taken along the line 6—6 in FIGURE 5.

FIGURE 7 is a sectional view taken along the line 7—7 in FIGURE 5.

FIGURE 8 is a diagrammatic view showing a circuit used in connection with the novel obstruction sensing means of the present invention.

Referring to the drawings in detail, wherein like numerals indicate like elements, there is shown in FIGURE 1, a tractor dispatch system designated generally by the numeral 10.

The system 10 includes a floor 12 having a main slot 14. A plurality of shunt slots intersect the main slot 14 at spaced points therealong. Thus, the main slot 14 is intersected by shunt slot 16 and shunt slot 18. While only two shunt slots are illustrated, it will be appreciated that a greater number of shunt slots are provided when practicing the present invention.

A self-propelled tractor 20 includes a generally horizontally disposed base 22 supported by a pair of front wheels 24 and a pair of rear wheels 26. Secured to the base 22 adjacent the rear wheels 26 is a battery compartment 28. A battery 30 or a group of batteries, is disposed in compartment 28. Drive motors 31, best seen diagrammatically in FIGURE 1, are drivingly engaged with rear wheels 26. It is of course evident that a single drive motor could be used. The battery 30 is exemplary of one propelling means for the tractor 20. If desired, tractor 20 may be propelled by an internal combustion engine.

The base 22 supports a pair of substantially parallel upright standards 32 and 34 at a front end portion thereof. The standards 32 and 34 are interconnected at their uppermost ends by a cross piece 36. Standards 32 and 34 are also interconnected at their midportions by cross piece 37. A cross piece 38 joins the lower portions of the standards 32 and 34. A generally circular latch plate 40 is fixedly secured to the cross piece 36. The latch plate 40 includes a V-shaped cam surface 42.

Cross piece 37 support a bracket 44. A barcket 46 is supported by the cross piece 38. Bracket 46 supports a slide bushing 48. A guide pin 50, the purpose of which will shortly become apparent, is slidably received in the bracket 44 and the slide bushing 48. The guide pin 50 may include a collar 52 disposed below bracket 44. The guide pin 50 includes a handle 56 adjacent its upper end, in sliding engagement with and supported by the V-shaped cam surface 42. As seen in FIGURE 1, when the handle 56 rests in the apex of the cam surface, the lower end portion of the guide pin 50, designated by the numeral 58, extends into the slot. It should be apparent that when the guide pin 50 and the handle 56 are rotated to positions other than that shown in FIGURE 1, the guide pin will be raised. Rotation of the guide pin 50 and the handle 56 to angles greater than 90° results in lifting of the lower end portion 58 from the slot.

Secured to the base 22 are a pair of trip rod support members 60 and 62. The trip rod support members 60 and 62 include spaced pairs of vertically aligned openings 64. A trip rod 66 or a plurality of trip rods, the purpose of which will be explained later, may be placed in selected ones of openings 64.

As seen in FIGURE 2, supported adjacent the front portion of the base 22 are bumper supports 68. Pivotably engaged with the bumper supports 68 are a pair of forwardly and upwardly extending links 70, the upper ends of which are fixed to a bumper 72. A rod 71, which may include a cam 73, is pivotably secured to the bumper 72. A rod 75, slidably supported on a front portion of base 22, is pivoted at one end to the rod 71. A collar on the rod 75 serves as a limit stop to limit rearward movement of the bumper 72. Biasing means, not shown, may be provided to bias the bumper to an outward position. A switch 78 is secured to the base portion 22 adjacent one of the bumper supports 68. A trip portion 74 is mounted on the rod 75 adjacent the switch 78, and serves to trip the switch 78 in response to a sufficient amount of rearward movement of the bumper 72, rod 71, and rod 75. The manner in which the bumper 72 is supported, per se, forms no part of the present invention, and hence it should be understood that other equivalent forms may be used.

The tractor 20 is adapted to pull a plurality of trucks along slot 14, thereby forming a train. The tractor 20 and the trucks forming the train may be coupled together serially in any convenient manner such as by hitches on the front and rear ends of the trucks to facilitate pulling the trucks by the tractor 20 from one location to another. Exemplary locations would be a storage corral for the trucks, with main slot 14 constituting another location.

As seen in FIGURES 1 and 2, supported at a rear portion of the base 22 is a draw bar or lug 57. The draw bar or lug 57 is supported for pivoting about a vertical axis corresponding to the axis of pins 59, and includes provision for receiving a tow pin 61. Such provision for receiving pin 61 may take the form of aligned openings, not numbered. As is best seen in FIGURE 2, the lower portion of the tow pin 61 engages a ring 79. The ring 79 serves as a leader for a tow line or chain designated generally by the reference numeral 80, to be more fully described below. As shown in FIGURE 2a, as an alternative arrangement, the ring 79 may also be secured to the lower portion 58 of the guide pin 50, although the former embodiment is preferred. Tow line 80 is preferably used when one or more of the towed trucks are to be diverted into a shunt slot thereby leaving the train.

Referring to FIGURES 1 and 2, there are seen a plurality of tow trucks 20' and 20", of which 20' is typical. As is seen in FIGURE 3, the construction of truck 20' is generally similar to that of the tractor 20. Accordingly, elements corresponding to those previously disclosed are designated by primed numerals, and need not be described in detail. Secured to the base 22' are a pair of trip rod support members 60' and 62'. The trip rod support members 60' and 62' include spaced pairs of aligned openings 64'. A trip rod 66' or a plurality of trip rods, the purpose of which will be explained shortly, may be placed in selected ones of openings 64'. It should be noted, however, that the openings 64' are ideally out of longitudinal alignment with the openings 64. The trucks 20', 20", etc., unlike the tractor 20, do not include drive apparatus. Also, the trucks 20' and 20" each have a pushing bumper 67 at their respective front ends, for a purpose to be explained later.

As is best seen in FIGURES 4–7, the chair 80 comprises a series of specially constructed links. Link 82 is of U-shaped cross section, and includes at its ends pairs of vertically spaced ears 83. A pin or rivet 84 passes through aligned openings in the ears 83. The second link 86 is received between the ears 83 and includes an elongated opening 88 at its end. The pin 84 passes through the opening 88, thereby securing the link 86 to the link 82.

As is best seen in FIGURE 4, the distance between the spaced ears 83 is greater than the width of the link 86. Also, the outer ends of the ears 83 are bent outwardly with respect to the link 86. Accordingly, the link 86 is pivotable in a horizontal plane with respect to the link 82.

Referring to FIGURE 6, the link 86 includes a recess 90, the purpose of which will shortly become apparent. An elongated slot 92 is located adjacent the other end of the link 86. A pin 93 passes through the elongated slot 92. The respective outer ends of the pin 93 are secured to a link 94 of U-shaped cross section. As is best seen in FIGURE 6, the distance between the sides of the link 94 is greater than the width of the link 86.

Secured to the upper surface of the link 94 is a dog or abutment 96. Referring once again to FIGURE 2, the guide pin 50 of the truck 20' includes a lower end portion 58'. As seen in FIGURE 5, the lower portion 58' of the guide pin 50' may extend into the recess 90 of the link 86. It is therefore apparent that the movement of the chain 80 to the right in FIGURES 5 and 6 causes engagement of the lower end portion 58' of the guide pin 50' with lateral edges of the link 94 and the dog or abutment 96. The link 94 and the dog or abutment 96 serve as a drive transmitting means, and such engagement is effective to tow the truck 20' over the floor 12 in response to the movement of the tractor 20. Those skilled in the art will recognize that if the link 94 is made of sufficiently heavy material, the dog or abutment 96 may be eliminated. It will also be appreciated that additional trucks such as truck 20" are to be towed by the chain 80 in the same manner.

The link 94 includes at its rear end a pair of spaced ears 97. A pin 98, which is similar to the pins 84 and 93 is secured at its ends to the ears 97. The pin 98 passes through an elongated slot 100 in one of the links 102. As seen in FIGURE 4, the distance between the ears 97 is greater than the width of the link 102. An elongated slot 104 in the other end of the link 102 engages a pin 106. The pin 106 is secured at its ends to a link 108. The link 108 is identical in all respects to the link 82. The remainder of the chain is merely a repetition of the sequence of links described above. It should be understood that the various links are of equal height, with the exception of the link 86, which includes the recess 90, and the link 94 which includes the upstanding dog or abutment 96. Thus, the lower portion 58' of the guide pin 50, when lowered into contact with the chain 80 will ride over the upper surface of the various links until it falls into the recess 90 and abuts against the link 94 and the dog or abutment 96. At such time, the truck 20' is placed in motion.

Although the particular chain construction herein described is favored, other equivalent tow lines may be used if so desired.

Also, if desired, wheels may be provided for the chain, as set forth in the copending application Ser. No. 493,912, assigned to the assignee of the present application.

Referring now to FIGURE 1, there is seen an actuator for the switch plate 114. This may take the form of an abutment 110 extending upwardly from a recess in the floor 12, although it should be understood that abutments flush with the floor, as are known to the art, may be used. Upstanding guards 112 are placed on either side of the abutment 110. The abutment 110 serves as an actuator for a switch plate 114. Although the abutment 110 is shown extending upwardly from a recess in the floor, it should be understood that other equivalent actuators, such as electrical or magnetic sensors, may be employed. The switch plate 114 is pivotably mounted at the mouth of the shunt slot 16, and when moved in a counterclockwise direction from the position shown in FIGURE 1, directs the guide pin 50, and hence the tractor 20 into the shunt slot 16. Entrance of the tractor 20 into the slot 16 causes the trucks 20' and 20" to follow since they are being towed by tractor 20.

Also seen in FIGURE 1 is a means whereby the switch plate 114 may be made to return to its initial position after passage of the last truck towed thereby. Thus, a lever 117 is pivotably mounted adjacent the slot 16. A link 115, which may be rigid or flexible, is secured at its respective ends to the lever 117 and the switch plate 114. When the switch plate 114 is in its counterclockwise position, the lever 117 extends across the slot 16. Thus, as the tractor 20 progresses into the slot 16, the lower end portion 58 of the guide pin 50 engages the lever 117, thereby causing tension on the link 115 and rotation of the switch plate 114. It should be apparent that the distance between the lever 117 and the switch plate 114 is greater than the length of the chain 80, thereby insuring passage of all of the towed trucks before switch plate 114 is reset. As an alternative, means responsive to the aforementioned trip rods 66 may be provided for resetting the switch plate 114. Thus, those skilled in the art will appreciate that such means for resetting switch plate 114 may be placed at the rear of the last truck on chain 80.

As seen in FIGURE 1, the trip rod 66 is aligned with the abutment 110. Such alignment is accomplished by placing the trip rod 66 in the proper openings 64 prior to dispatching the train and after selecting slot 16 as the destination. Contact between the trip rod 66 and the abutment 110 is effective to displace the switch plate 114 in the aforementioned counterclockwise direction. The upstanding guards 112 prevent inadvertent movement of the abutment 110 by objects on the floor 12 or accidental kicking by workers in the area.

Also shown in FIGURE 1 is a second abutment 116 and a second pair of guards 118. It is to be understood that the abutment 116 serves to actuate the switch plate 120. The switch plate serves to illustrate another novel aspect of the invention. Thus, if it is desired to have the train bypass slot 16 and to route the truck 20' into shunt slot 18, one need only remove rod 66 and insert the trip rod 66' in the proper openings 64' corresponding to the location of the abutment 116 as illustrated. Thus, when displaced in a clockwise direction, the switch plate 120 directs the guide pin 50', and hence the truck 20', into the slot 18. It is apparent from FIGURES 2 and 6 that as the tow pin 50' enters the shunt slot 18, its lower end portion 58' becomes disengaged from the link 94 and dog 96 by merely sliding laterally with respect to the link 86, and out of the recess 90. The push bumper 67 on the truck 20" is effective to propel the truck 20' into the slot, and out of the path of other trucks moving along the main slot 14.

Referring again to FIGURE 1, the switch plate 120 is provided with a projection or ear 121 which extends across the shunt slot 18 when the switch plate 120 is in its clockwise position. Thus, the lower end portion 58' of guide pin 50', in entering the shunt slot 18, resets the switch plate 120 to its normal position, that is, the one shown in FIGURE 1. Hence, subsequent trucks continue to be towed by tractor 20 and follow the main slot 14.

Also, successive trucks may be sent to the same or different shunt slots. Thus, by means of trip rod 69 in FIGURE 1, the truck 20" may be sent to another shunt slot, not shown, although the truck 20' enters the shunt slot 18, or vice versa. It should be apparent, however, that regardless of the number of trucks used, the last truck will always be made to remain secured to the chain 80 so that it pushes any preceding diverted truck into its shunt slot. Trucks 20', 20", etc., are provided at their rear ends with a depending lip 119 to facilitate pushing.

Referring now to FIGURE 8, there is a diagrammatically shown circuit which is a part of a novel obstruction sensing means for use on the truck 20. The circuit 122 includes the battery 30, the motor 31, the switch 78, a guide pin position responsive switch 123, and a manually operated off-on switch 124, all in series. The switch 78 is spring biased to a closed position, thereby permitting current flow therethrough. It is therefore apparent that when the manual switch 124 is placed in a closed position, and no obstruction is present, current may flow from battery 30 to motor 31, thereby driving the tractor 20.

As seen in FIGURE 8, the novel obstruction sensing means is in cooperation to stop the motor 31. Thus, the bumper 72 is in contact with the lip 119 on the rear portion of another truck. Consequently, the bumper 72, the rods 71 and 75 and trip portions 74 have moved rearwardly. The rearward movement of the trip portion 74 has opened the normally closed switch 78. Accordingly, since the switch 78 is in series with the motor 31, the flow of current is cut off. Alternatively, switch 78 could be adapted to control a clutch so that while power is not shut off, it is disconnected with respect to the wheels. Thus, it is apparent that the tractor 20 may safely be left running without fear of damage to other trucks or its own running parts. Should it encounter any obstruction in its path, drive to the wheels is shut off in the manner set forth above. It should be understood that the "obstruction" contemplated may be a stationary truck, other article, or an abutment placed for the express purpose of stopping the tractor at the desired point. A switch 123, which is in series with the switch 78 and the motor 31, is mounted on any convenient portion of the tractor 20 adjacent the guide pin 50. A collar 125 on the guide pin 50 is adapted to contact the switch 123 upon raising of the pin 50. Accordingly, if the tow pin is accidentally lifted, the train will stop. Also, lifting of the pin 50 and, consequently, opening of the switch 123 may be made responsive to engagement of obstructions by the bumper 72. This may be accomplished in numerous ways, of which the apparatus shown in FIGURES 2 and 8 is exemplary.

Thus, in FIGURE 2, the guide pin 50 is provided with a cam follower 77. The cam follower 77 may be engaged by the previously mentioned cam 73, secured to the rod 71. Rearward movement of the bumper 72 and rod 71 results in corresponding rearward movement of the cam 73, and consequently, upward movement of the cam follower 77 at guide pin 50. As explained heretofore, upward movement of the guide pin 50 is effective to open the swtich 123.

Other means responsive to movement of the bumper may be used to shut off drive to the wheels. For example, the trip portions 74 may operate a timer, which stops the flow of current, but reactivates the motor after a short period of time.

The switch 124 may be located on any convenient part of the truck 20, and is most advantageously made operable by one standing on the floor adjacent the moving truck. Thus, when it is desired to stop the truck, the attendant need merely reach out and open the switch 124.

Although illustrated as having a self-contained battery operated power unit, it should be understood that the present invention map be practiced with a truck which draws power from an outside source or which includes an internal combustion engine. The illustrated embodiment is preferred, however, because it provides for maximum flexibility of arrangement and ease of installation. Those skilled in the art will also appreciate that the truck 20 may be provided with selectively operable steering means which permits its use, when so desired, as a steerable vehicle independently of the guidance slots. The length of chain 80 is substantially shorter than the main slot. The slot may be several miles long while chain 80 is on the order of 100 feet in length, although it may be longer or shorter for any particular system.

It will be understood that the abutment 110 may be connected to its switch plate 114 in any convenient manner such as is disclosed in U.S. Letters Patent 3,261,300.

The slot 16 may lead to a storage area for tractors and/or trains or may lead to another system having its own main and shunt slots. Hereinafter, the trip rods and their openings may be referred to a selectively positionable means for initiating actuation of a switch plate. It will be apparent that the selectively positionable means on tractor 20 is outside the range of the selectively positionable means on the tow trucks.

The present invention may be embodied in other specific forms without departing from the spirit or essential attributes thereof and, accordingly, reference should be made to the appended claims, rather than to the foregoing specification.

I claim:
1. A material handling system comprising means defining a main slot, a self-propelled driverless tractor, guide means supported solely by said tractor and extending into said slot for guiding the tractor along a path defined by said slot, an elongated tow line of finite length disposed entirely in said slot and being substantially shorter than the length of said slot, tow line engaging means supported solely by said tractor and connecting said tractor with an end portion of said tow line so that the tractor may pull said tow line along said slot, drive transmitting means on said tow line and disposed entirely in said slot, at least one tow truck, said tow truck having guide means movably supported thereby and having one position wherein it extends into said slot and engages said drive transmitting means so that the truck may be pulled by the tow line while being guided by the slot.

2. A system in accordance with claim 1 wherein said tow line is a flexible drag chain having a plurality of said drive transmitting means at spaced points therealong.

3. A system in accordance with claim 1 wherein said tow line engaging means and said tractor guide means comprises a single downwardly extending pin disposed at one end of said self-propelled tractor.

4. A system in accordance with claim 1 wherein said self-propelled tractor comprises a base, a plurality of wheels supporting said base, drive means suported by said base and coupled to at least one of said wheels, manually operated means on said tractor for selectively activating said drive means, obstruction sensing means secured to the front of said self-propelled tractor, and means responsive to said obstruction sensing means for deactivating said drive means independently of said manually operated means.

5. A system in accordance with claim 1, and a plurality of shunt slots intersecting and extending in directions away from said main slot, means at the intersections of said main slot and at least one of said shunt slots for switchng said tractor from movement along said main slot to movement along said one shunt slot, actuator means for moving said switching means to a position for switching said tractor from movement along the main slot to movement along said one shunt slot, selectively positioned means on said self-propelled tractor for selectively actuating said actuator means, and means coupled to said switching means for resetting said switching means in response to passage of said tractor into said one shunt slot.

6. A system in accordance with claim 5 wherein said means for resetting said switching means comprises means extending into said one shunt slot for contact with said guide means on said self-propelled tractor.

7. A system in accordance with claim 1 including a plurality of trucks towed by said line, a plurality of shunt slots intersecting and extending in directions away from said main slot, means at the intersections of said main slot and said shunt slots for switching selected trucks from movement along said main slot to movement along a selected one of the shunt slots, actuator means for moving said switching means to a position for switching said trucks, selectively positioned means on said trucks for actuating said actuator means for moving said switching means, and means coupled to said switching means for resetting said switching means in response to passage of a truck into said one shunt slot.

8. A system in accordance with claim 4 wherein said drive means comprises an electric power source, and said sensing means includes a movable bumper on the front end of the base.

9. A system in accordance with claim 4, and means responsive to lifting of said guide pin for deactivating said drive means independently of said manually operated means.

10. A system in accordance with claim 1 including a tow truck fixedly secured to a rear portion of said tow line for pushing any preceding truck into a shunt slot.

11. A material handling system comprising a self-propelled driverless tractor, an upright pin on one end of said tractor, said pin being movable to a position where its lower end is below the wheels on said tractor so that the lower end may enter a guide slot along which it is desired to dispatch said tractor, a plurality of trucks to be towed by said tractor along a guide slot, means interconnecting the trucks into a train with the tractor so that the tractor may tow the trucks along a guide slot, an upright guide rod on each truck monuted for movement so that the lower end of the guide rod will be below the wheels on the trucks and enter a guide slot, and selectively positionable means on the front end of said tractor for initiating actuation of a switch plate so that the tractor and said trucks may be diverted from movement along the main slot to movement along a shunt slot, selectively positionable means on some of said trucks for initiating actuation of a switch plate so that some of said trucks may be diverted for movement along other shunt slots, the selectively positionable means on said tractor being outside the range for the corresponding means on the trucks so that individual trucks cannot enter said first shunt slot except when being towed by said tractor.

12. A material handling system in accordance with claim 11 wherein said means interconnecting the trucks into a train with the tractor includes a tow line of finite length disposed within the guide slot, said tow line having drive transmitting means thereon at spaced points therealong for engagement with the guide rod on a truck to push the truck along the guide slot.

References Cited

UNITED STATES PATENTS

| | | | |
|---|---|---|---|
| 2,892,418 | 6/1959 | Cena | 104—170 |
| 3,094,944 | 6/1963 | Bradt | 104—170 |
| 3,169,733 | 2/1965 | Barrett | 104—148 |
| 3,174,438 | 3/1965 | Hariton | 104—88 |
| 3,316,856 | 5/1967 | Edgar | 104—178 |
| 3,349,718 | 10/1967 | Bradt | 104—172 |

ARTHUR L. LA POINT, Primary Examiner

D. F. WORTH III, Assistant Examiner

U.S. Cl. X.R.

104—178